(12) United States Patent
Vidal et al.

(10) Patent No.: US 8,806,471 B2
(45) Date of Patent: Aug. 12, 2014

(54) UPGRADE AND DOWNGRADE IN PACKAGE UPDATE OPERATIONS

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 969 days.

(21) Appl. No.: 12/892,227

(22) Filed: Sep. 28, 2010

(65) Prior Publication Data

US 2012/0079471 A1     Mar. 29, 2012

(51) Int. Cl.
*G06F 9/44*     (2006.01)

(52) U.S. Cl.
USPC ............................ 717/170; 717/168; 717/169

(58) Field of Classification Search
USPC .......................................................... 717/170
See application file for complete search history.

(56) References Cited

U.S. PATENT DOCUMENTS

| | | | |
|---|---|---|---|
| 6,438,749 B1 | 8/2002 | Chamberlain | |
| 6,704,933 B1 * | 3/2004 | Tanaka et al. | 725/132 |
| 6,725,452 B1 * | 4/2004 | Te'eni et al. | 717/168 |
| 7,100,158 B2 * | 8/2006 | Nakane et al. | 717/172 |
| 7,131,122 B1 * | 10/2006 | Lakhdhir | 717/168 |
| 7,240,336 B1 | 7/2007 | Baker | |
| 7,512,939 B2 | 3/2009 | Brookner | |
| 7,624,393 B2 | 11/2009 | Egan et al. | |
| 7,657,885 B2 | 2/2010 | Anderson | |
| 7,836,341 B1 | 11/2010 | Krishnan | |
| 2003/0051235 A1 | 3/2003 | Simpson | |
| 2003/0229890 A1 | 12/2003 | Lau et al. | |
| 2004/0034861 A1 * | 2/2004 | Ballai | 719/321 |
| 2005/0210459 A1 | 9/2005 | Henderson et al. | |
| 2006/0190773 A1 | 8/2006 | Rao et al. | |
| 2006/0230398 A1 | 10/2006 | Yokota | |
| 2007/0038991 A1 | 2/2007 | Schuft et al. | |
| 2007/0157192 A1 | 7/2007 | Hoefler et al. | |
| 2007/0169075 A1 | 7/2007 | Lill et al. | |
| 2008/0134165 A1 | 6/2008 | Anderson et al. | |
| 2008/0141240 A1 | 6/2008 | Uthe | |
| 2008/0201705 A1 | 8/2008 | Wookey | |
| 2009/0013319 A1 | 1/2009 | Williams et al. | |
| 2009/0037897 A1 | 2/2009 | Dull et al. | |
| 2009/0144719 A1 * | 6/2009 | Pazdziora | 717/171 |

(Continued)

OTHER PUBLICATIONS

Author Unknown, "Yum (Yellowdog Updater, Modified) Howto: Introduction", Duke University, archived Sep. 25, 2009 at <http://web.archive.org/web/20090925143811/http://www.phy.duke.edu/~rgb/General/yum_HOWTO/yum_HOWTO/yum_HOWTO-1.html>, 7 pages.*

(Continued)

*Primary Examiner* — James D Rutten
(74) *Attorney, Agent, or Firm* — Lowenstein Sandler LLP

(57) ABSTRACT

Embodiments relate to systems and methods for automatic upgrade and downgrade in package update operations. A physical or virtual client machine can host an installed software distribution including a set of installed software packages, such as an operating system, application, and/or other software. A package manager on the client can manage the set of installed packages, and report the installed distribution including version and component packages to one or more package servers. When a distribution upgrade is initiated, the package manager and/or other distribution logic can analyze the target distribution, to determine whether each package in the target distribution represents the most-current version of each component package. Packages which represent the most-current can be installed. Packages which do not represent the most-current version, e.g. due to slippage in vendor updates or versions, can be substituted with a most-current version automatically retrieved from a software repository or other source.

20 Claims, 6 Drawing Sheets

(56) References Cited

U.S. PATENT DOCUMENTS

2009/0300595 A1 12/2009 Moran et al.
2010/0023933 A1 1/2010 Bryant et al.
2010/0058308 A1 3/2010 Demshur et al.
2010/0058314 A1 3/2010 Wang
2010/0083243 A1 4/2010 Mincarelli et al.

OTHER PUBLICATIONS

Author Unknown, "AptPreferences—Debian Wiki", archived Jan. 10, 2010 at <http://web.archive.org/web/20100110132910/http://wiki.debian.org/AptPreferences?>, 5 pages.*
Seth Kelby Vidal, "Systems and Methods for Initiating Software Repairs in Conjuction With Software Package Updates", U.S. Appl. No. 12/714,200, filed Feb. 26, 2010.
Seth Kelby Vidal, "Systems and Methods for Diagnostic Notification via Package Update Manager", U.S. Appl. No. 12/714,258, filed Feb. 26, 2010.
Seth Kelby Vidal, "Systems and Methods for Managing Software Package Updates Using Communication Pipes", U.S. Appl. No. 12/714,208, filed Feb. 26, 2010.
Seth Kelby Vidal, "Systems and Methods for Generating and Storing Translation Information as Package Metadata", U.S. Appl. No. 12/714,171, filed Feb. 26, 2010.
Seth Kelby Vidal, "Systems and Methods for Generating Predictive Diagnostics via Package Update Manager", U.S. Appl. No. 12/714,222, filed Feb. 26, 2010.
James Antill, "Systems and Methods for Defining and Enforcing Access Policy for Package Update Processes", U.S. Appl. No. 12/873,850, filed Sep. 1, 2010.
Seth Kelby Vidal, "Systems and Methods for Generating Cached Representations of Encoded Package Profile", U.S. Appl. No. 12/788,139, filed May 26, 2010.
Seth Kelby Vidal, "Systems and Methods for Generating Cached Representations of Host Package Inventories in Remote Package Repositories", U.S Appl. No. 12/790,699, filed May 28, 2010.
Seth Kelby Vidal, "Systems and Methods for Generating Package Profiles in Software Package Repositories Using Selective Subsets of Packages", U.S. Appl. No. 12/873,557, filed Sep. 1, 2010.
Seth Kelby Vidal, "Systems and Methods for Generating an Encoded Package Profile Based on Executing Host Processes", U.S. Appl. No. 12/787,104, filed May 26, 2010.
Seth Kelby Vidal, "Systems and Methods for Restoring Machine State History Related to Detected Faults in Package Update Process", U.S. Appl. No. 12/788,036, filed May 26, 2010.
Seth Kelby Vidal, "Systems and Methods for Generating Client Qualification to Execute Package Update Manager", U.S. Appl. No. 12/788,458, filed May 27, 2010.
Seth Kelby Vidal, "Systems and Methods for Determining When to Update a Package Manager Software", U.S. Appl. No. 12/790,752, filed May 28, 2010.
Seth Kelby Vidal, "Systems and Methods for Generating Exportable Encoded Identifications of Networked Machines Based on Installed Package Profiles", U.S. Appl. No. 12/768,416, filed Apr. 27, 2010.
Seth Kelby Vidal, "Systems and Methods for Tracking Computing Systems Utilizing Software Repositories", U.S. Appl. No. 12/955,671, filed Nov. 29, 2010.
Seth Kelby Vidal, "Systems and Methods for Managing Versions of Software Packages", U.S. Appl. No. 13/037,363, filed Mar. 1, 2011.
Seth Kelby Vidal, "Systems and Methods for Detection of Malicious Software Packages", U.S. Appl. No. 12/898,876, filed Oct. 6, 2010.
Seth Kelby Vidal, "Systems and Methods for Space Efficient Software Package Management", U.S. Appl. No. 12/610,006, filed Oct. 30, 2009.

* cited by examiner

| VERSION RECONCILIATION TABLE 158 | | | |
|---|---|---|---|
| PACKAGE VERSION ID (154) | MOST-CURRENT PACKAGE VERSION (166) | MOST-CURRENT RELEASE DATE | ... |
| A1 | A2 | 9/30/10 | |
| B1 | B3 | 10/3/10 | |
| C3 | C8 | 10/15/10 | |
|  |  |  | ⋮ |
| Z4 | Z8 | 10/20/10 | |

FIG. 2B

UPGRADE AND DOWNGRADE IN PACKAGE UPDATE OPERATIONS

FIELD

The present teachings relate to systems and methods for automatic upgrade and downgrade in package update operations, and more particularly, to platforms and techniques for automatically identifying packages for upgrade and downgrade activity in connection with the installation of software distributions in order to produce the most-current version of each package installed on a target machine.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set.

Software package update managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories, to directly connect to those databases and download available package updates. In cases, the package update can be formatted as a single combined file containing the various component files, and can be compressed for easier transmission.

The task of managing a network of physical and possibly virtual machines can be complicated by the need to identify and track the population of the machines under management, and the various software package complements and/or entire software distributions, such as operating system distributions, installed on those machines. The machines under management and their package complements may need to be identified and tracked for a variety of purposes, including, for instance, to identify and schedule package updates, activate and deactivate machines assigned to networks including on-premise and cloud networks, to perform maintenance, or other package or network management tasks.

In various networks, it may be periodically desired by users and/or administrators to perform a distribution upgrade, for instance to update one or more client machines from an installed distribution version of Linux™ and/or other software to a target, presumably upgraded, version of the same distribution. In general regards, if all software packages contained in the installed distribution were present in the target distribution in their most-current or up-to-date form, performing such a distribution upgrade would be a straightforward task.

However, in actuality, the packages contained in the target distribution may not always represent the most-current versions of the same packages already installed (in earlier versions) on the existing distribution hosted by the client. This can occur for a variety of reasons or due to a variety of factors. For one, a software distribution can contain a relatively large number of packages and constituent files of those packages, for instance on the order of hundreds or thousands of packages and/or files. Frequently, the packages (and/or files) contained in a distribution can be contributed by a diverse set of software vendors or other suppliers. For distributions of various types, there may be insufficient coordination between the different vendors to result in the absolutely most-recent version of all (potentially thousands or more) packages being inserted into the overall software distribution. For instance, vendors or other software suppliers frequently patch or update their packages or other files. In many cases, these updates can be labeled or named with a relatively minor or incremental version number update, e.g. from version 3.2 to version 3.3 of the package or software of the same name.

However, incremental or ongoing package updates can take place at any time, including after an overall distribution is finalized and potentially encoded and stored in a software repository or other data store. Package update logic used to retrieve and install updates may not be configured to locate all incremental or other updates for packages in the target distribution. In cases, the most-recent version of a package may be re-named or re-identified by a different package or file name, after the software distribution is finalized.

Further, different software vendors or other contributors may adopt inconsistent naming or versioning schemes for their package updates, depending on time of release and other factors. For instance, one vendor may contribute Package X, Version 2.0 for Distribution A, and within a month of the version being embedded into Distribution A, develop or release version 2.1 of Package X. In an effort to discriminate that version from others, the contributing vendor may label or name that package "Package_X_Distro_A__2.1," or other complex identifier intended to indicate the distribution with which a package version is correlated.

However, complex identifiers may lead to inconsistencies or confusion in terms of downstream updates and associated distributions. If the same exemplary vendor released a further update to the same package after a further distribution B, they might label that package "Package_X_Distro_B__1.0" or similar. However, if a subsequent package update is made, the vendor may unable to attach a label to that further update that will intelligibly indicate whether that package represents an update to Package_X_Distro_A__2.1, Package_X_Distro$_{13}$ B__1.0, or both, or neither.

In further regards, the naming conventions and update position of package versions can become yet further complicated if a vendor produces multiple updates for different step versions (e.g., versions 2.2, 2.3, etc. as well as 3.1, 3.2, 3.3, etc.), in which case there may be multiple series of versions, some of which are more recent than others but not all of which may represent an upgrade to each other. Similarly, consistency may become problematic between package versions when a vendor or does not produce an update, or any package at all, for inclusion in additional downstream distribution versions. In those cases and others, the installation logic may wish to revert to a prior version of a software package which still represents the most-recent version, even if a nominally higher-labeled version is incorporated in a distribution or otherwise. In existing installation platforms, the ability to automatically seek, detect, and install the most-recent version of a software package contained in a distribution is not provided. Users are instead relegated to manually searching or confirming that all packages are compatible and up-to-date after performing an update to a distribution.

It may be desirable to provide systems and methods for automatic upgrade and downgrade in package update operations, in which an administrator or other user can initiate a distribution upgrade in which the installation logic can automatically detect and install the most-recent version of constituent packages, regardless of package name or version compatibilities across different package versions and between distribution version upgrades.

DESCRIPTION OF DRAWINGS

The accompanying drawings, which are incorporated in and constitute a part of this specification, illustrate embodiments of the present teachings and together with the description, serve to explain the principles of the present teachings. In the figures:

FIGS. 2A and 2B illustrates exemplary data structures, encodings, and other features that can be used to store and process data related to software distributions in conjunction with systems and methods for automatic upgrade and downgrade in package update operations, according to various embodiments;

DESCRIPTION OF EMBODIMENTS

Figure 1:
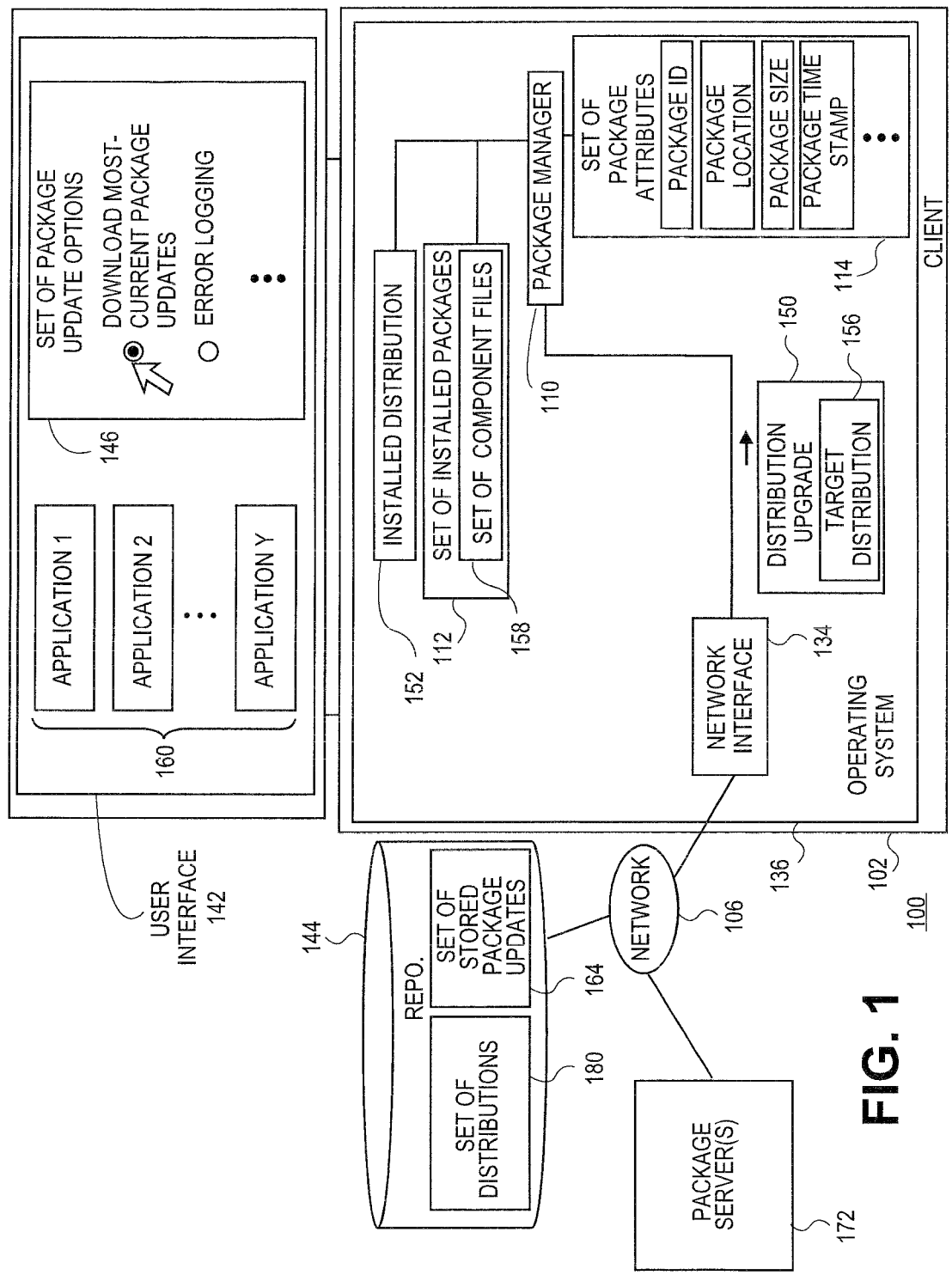
FIG. 1 illustrates an overall network in which systems and methods for automatic upgrade and downgrade in package update operations can be implemented, according to various embodiments.

Embodiments of the present teachings relate to systems and methods for automatic upgrade and downgrade in package update operations. More particularly, embodiments related to platforms and techniques for managing the upgrading of software distributions in which the package manager and/or other logic can automatically sort, identify, track and install the most-recent or most-current version of a package that is being updated, for instance as part of an overall software distribution upgrade. In aspects, a package manager can generally track and manage the installation of one or more software packages and/or updates to those packages (which may be referred to together as a "software package update" and/or "package installation") on a client, host, target, physical, virtual, and/or other machine. The local package manager can be configured to access the set of installed packages in a distribution or otherwise, and their related attributes on the client or other machine, and derive or generate an inventory of the distributions, packages, and/or constituent files present on that associated machine. In embodiments, the inventory of the set of installed packages can comprise a list, tree, and/or other record of the software applications installed on a client machine in the managed network. In aspects, the inventory of the set of installed packages for a client machine can be captured and reported by the local package manager installed on that machine, and/or by other local or remote software, services, or logic.

According to further regards, the package manager and/or other logic can receive a request to initiate a distribution upgrade to upgrade a software distribution installed on the client machine. In aspects, the package manager and/or other logic can identify one or more installed distributions, such as operating system versions with related resources, installed on the subject client, and transmit or communicate the inventory of the set of installed packages including that distribution version to one or more than one remote management platforms. The one or more remote management platforms can be or include one or more package servers and/or one or more repositories associated with the server(s), and/or other platforms or logic. In embodiments, the one or more package servers and/or other logic can receive the inventory of the set of installed packages from the requesting machine, and identify the highest-version or other available upgrade for the distribution that the client or user is requesting.

In aspects, after the installed and target distributions defining the distribution update are identified, the package manager and/or other logic can examine the entire set of packages in the target distribution to determine whether each package in the target corresponds to the most-recent or otherwise most-current version of that package, on a package-by-package basis. The package manager and/or other logic can in embodiments determine whether a subject package represents a most-current version, regardless of actual or nominal version number and/or package name, by accessing a version reconciliation table and/or other record recording or encoding a most-current or most-recent version of distributions, packages, files, and/or other data objects or attributes associated with software distributions and/or software packages. When a component package contained in the target distribution of the distribution upgrade represents the most-current version, the package manager and/or other logic can install, retain, and/or otherwise use that version. When a component package contained in the target distribution of the distribution upgrade does not represent the most-current version, the package manager and/or other logic can identify and retrieve the correct most-current version and install, retain, and/or otherwise use that version, for instance by accessing a software repository or other data store. In this manner, the resulting distribution upgrade, as adjusted for currency, can be synchronized with and deploy the most-current or most-recent set of software packages for an entire distribution, without a need for user intervention. Better consistency and reliability in distribution upgrade operations can in regards be achieved.

Reference will now be made in detail to exemplary embodiments of the present teachings, which are illustrated in the accompanying drawings. Where possible the same reference numbers will be used throughout the drawings to refer to the same or like parts.

FIG. 1 illustrates an exemplary system 100 in which systems and methods for automatic upgrade and downgrade in package update operations can be implemented, according to various embodiments. In embodiments as shown, a client 102 can store, execute, and otherwise host a variety of resources including a package manager 110 configured to communicate with a set of installed packages 112, and other hardware, software, and resources. In embodiments, the package manager 110 can be or include a software application, a utility, an application programming interface (API) to an operating system 136 of client 102, a service, and/or other local or remote logic or resources. According to embodiments, the package manager 110 can access and manage the set of installed packages 112 to identify, run, edit, update, configure, and otherwise manage one or more software installed distribution 152 and/or other packages or software locally hosted or installed in the client 102. In aspects, the package manager 110 can be or include one or more commercially and/or publicly available package manager applications or resources, such as the "yum" package update manager available from Red Hat Inc. based on or compatible with the Red Hat package manager (rpm) platform, or others.

In aspects, the installed distribution 152 can be or include one or more software distributions consisting of a set of related packages, for instance a distribution of an operating system such as the Linux™ operating system, such as the Fedora distribution available from Red Hat Inc., and/or other distributions such as the Ubuntu™ or other commercially or publicly available distributions. In aspects, the installed distribution 152 can represent distributions based on software other than operating systems, such as a set of applications. In aspects, the client can host a set of installed software packages 112 can be or include packages comprising various types of applications, files, and/or other resources such as, for example, messaging applications, spreadsheet or modeling applications, social networking applications, word processing applications, modeling applications, media applications, and/or other applications, software, or utilities. In aspects, the set of installed software packages 112, can in aspects be associated with the installed distribution 152 and/or other distributions or installations, and can include an operating system, drivers, and/or components thereof. The set of installed packages 112 can have an associated set of package attributes 114 which records file names, versions, dates, storage size, software or hardware requirements, an/or other attributes or metadata related to the software packages and/or their updates installed on client 102. In aspects, a user may browse set of installed packages 112 in list or other form via selector tool 146 or other interface, to check or otherwise select one or more packages to analyze, manage, and/or identify on client 102.

In aspects, and as also shown, the package manager 110 can communicate with a network interface 134 configured to connect to one or more network 106, such as the public Internet or other public or private networks. The package manager 110 can thereby connect to one or more package servers 172 and/or associated one or more repositories 144 hosting software packages including a set of distributions 180, a set of stored software package updates 164, and/or other software or resources. The one or more package servers 172 can in embodiments include logic to identify, organize, and distribute one or more distributions, software packages, and/or other data, files, or information to the requesting client, server, virtual, and/or other machines.

In aspects, the package manager 110 can interact with the set of installed packages 112, one or more package servers 172, and/or the associated one or more one or more repositories 144 via network interface 134 and one or more networks 106 to identify and manage the installation and hosting of the installed distribution 152, as well as the content of set of installed packages 112 operating on client 102. The package manager 110 of each client 102 in the managed network can develop and inventory the installed distribution 152, the set of installed packages 112 and other resources of each machine, and report that inventory data to the one or more package servers 172. In aspects, the package manager 110 can, for example, provide a user with a selector tool 146 displayed via user interface 142, such as a graphical user interface or others, to select various test, configuration, inventory, and/or other management activities on the installed distribution 152, the set of installed packages 112, and/or other files or resources. The selector tool 146 can present options to select distributions and/or packages for installation and/or update, and/or to carry out various other installation options. The selector tool 146 can likewise present options to initiate an inventory of one or more installed distribution 152, the set of installed packages 112 and/or constituent files located on client 102, and/or other selectable options or parameters for managing the distribution and package complement of the client 102.

In aspects, in general the package manager 110 can access and extract information related to the installed distribution 152 and/or the set of installed packages 112 to generate the inventory 154 and transmit that inventory to the one or more package servers 172 and/or associated one or more repositories 144. The inventory of the distribution(s), set of installed packages, and/or related files extracted from each client 102 can contain a list or other record or enumeration of the installed distribution 152, the set of installed packages 112, and/or any files on the client 102, such as the distribution and/or package name or other identifier for each distribution, package, and/or file installed, present, and/or hosted on the client 102. In aspects, the inventory 154 can be arranged as a list, database, tree, and/or other record or data object. In aspects, the inventory 154 can in addition or instead incorporate some or all of the set of package attributes 114 for each distribution, package, and/or file identified in the inventory 154.

It may be noted that in embodiments, the package manager 110 can generate the inventory 154 and associated data, in an encoded format. In aspects, package manager 110 may for instance generate a string, label, value, address, and/or other identifier which identifies or associates client 102 by or with its hosted installed distribution 152, set of installed packages 112, and/or associated files. For instance, the package manager 110 can generate the inventory 154, or components thereof, as the output of a hash function or hash operation performed on one or more attributes contained in set of package attributes 114 for one or more packages of the client 102. For instance, package manager 110 can perform a hash function, such as Secure Hash Algorithm 1 (SHA1) or other hash function versions and/or other encoding algorithms, on attributes such as the package name, package epoch, package timestamp, package size, and/or other data. In embodiments, the inventory 154 can also be stored or formatted in an unencoded format.

In embodiments, and as also shown in FIG. 1, the one or more package servers 172 can receive a request 180 from the client 102 to initiate a distribution upgrade 150 to update or upgrade an installed distribution 152. In connection with the request, before, during, and/or after initiation of the request 180, the package manager 110 of the client 102 can transmit the inventory 154 from the client 102 to the one or more package servers 172 and/or one or more repositories 144. The package manager 110 can subsequently communicate with the one or more package servers 172 and/or one or more repositories 144 to identify, analyze, build and install a target distribution 156 on the client 102, subject to updates, substitutions and/or other modifications by package manager 110 and/or other logic to ensure that the most-current version of each package in the target distribution 156 is identified and installed to the client 102, whether or not the most-current version is reflected or incorporated in the target distribution 156 as stored and delivered by the one or more package servers 172 and/or one or more repositories 144.

Figure 2A:
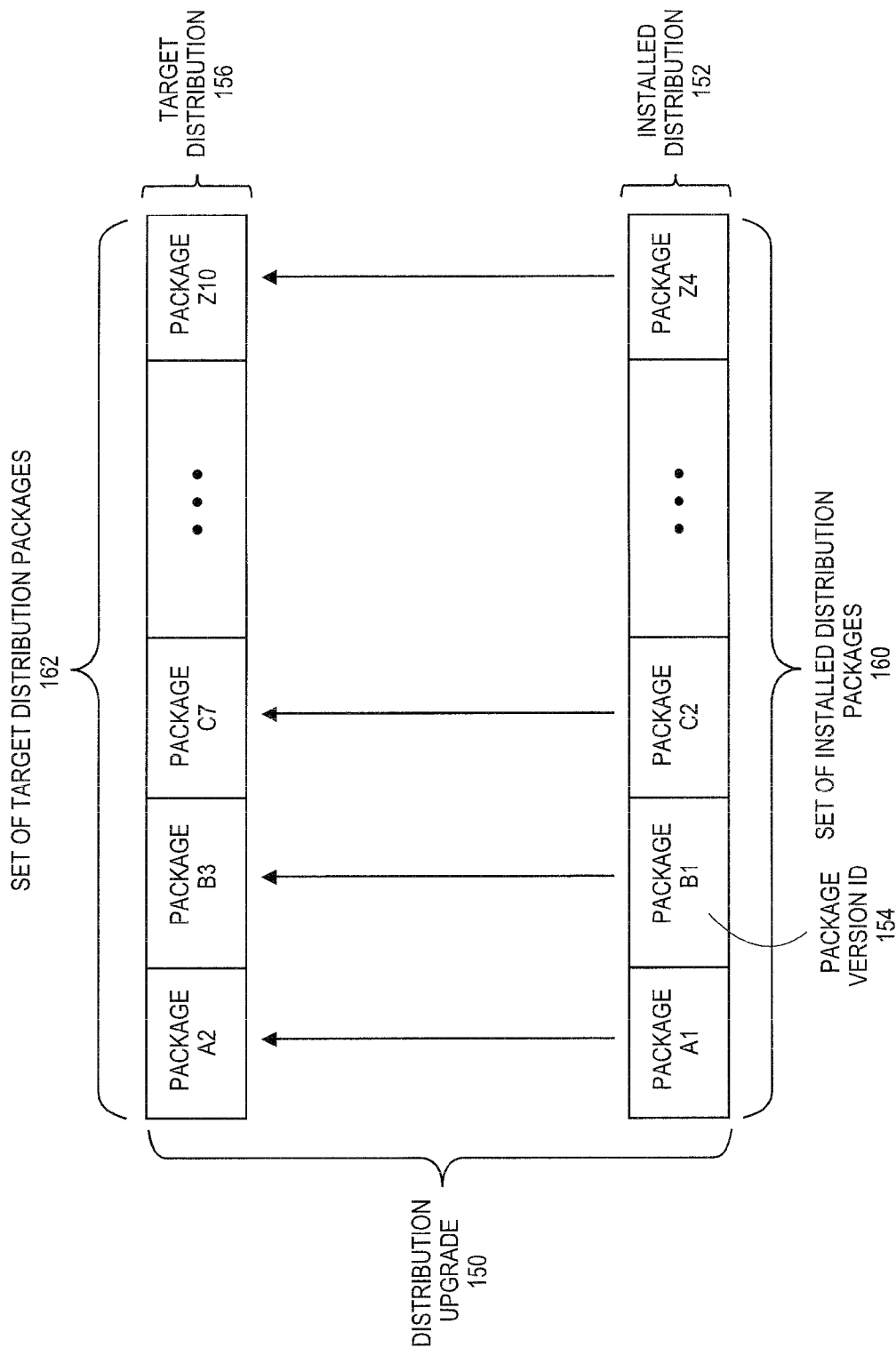

As illustrated for example in FIG. 2A, the package manager 110 and/or other logic can access, retrieve, analyze and install the distribution upgrade 150 on the client 102 and/or other target, machine, or destination. According to aspects, the distribution upgrade 150 can comprise an installed distribution 152, which may be already installed and hosted on client 102 and/or other machine. The distribution upgrade 150 can update or upgrade the installed distribution 152 to the target distribution 156. In aspects, the target distribution 156 can be an upgraded version of the distribution upgrade 150, such as, for example, an upgrade from a Fedora™ desktop Linux installation version 12 to Fedora™ desktop Linux installation version 13.2. The target distribution 156, in embodiments, need not be a next sequential version of the installed distribution 152. For instance, a given user can update or migrate from a Fedora™ desktop Linux installation version 10.2 to Fedora™ desktop Linux installation version 13.1. In aspects, the installed distribution 152 can comprise a set of installed distribution packages 160, each of which can be identified by a package version ID 154. The package version ID 154 can comprise a package name, package version number, a package version date reflecting the date of release or distribution of that package, a package installation date reflecting the date of installation of that package on client 102, and/or other attributes or information.

The target distribution 156 can comprise a set of target distribution packages 162, also identified by a package version ID 154 and/or other attributes or information. In aspects, in general, for each package in set of installed distribution packages 160, there may be one corresponding package in the set of target distribution packages 162, although exceptions may occur. In aspects in general, a user may wish to execute the distribution upgrade 150 to move from the installed distribution 152 to the target distribution 156, and ultimately install and place the most-current version of each package in the set of target distribution packages 162 on client 102. In cases, there may be distribution upgrade 150 between one installed distribution 152 and target distribution 156 in which each package version reflected in the package version ID 154 of the target distribution 156 already contains the most-current version of each target package. In aspects, a distribution upgrade 150 for which this is true need not undergo any further processing to retrieve the correct most-current version of one or more packages, although the current status of each of package of the set of target distribution packages 162 may be verified as described herein.

In terms of processing the distribution upgrade 150 in situations where one or more packages in the target distribution 56 may not represent the most-current version of packages in the installed distribution 152 intended to be upgraded, the package manager 110 and/or other logic can build, maintain, and/or access a version reconciliation table 158 to identify the currency of one or more packages in the target distribution 156. According to embodiments as shown, the version reconciliation table 158 can maintain a record of the package version ID 154 for one or more packages that can be found in various distributions in one or more managed networks, and/or other installations. Along with the package version ID 154, the version reconciliation table 158 can store or record the most-current version ID 166 for each package recorded by package version ID 154. In embodiments, the version reconciliation table 158 can record different most-current version IDs 166 for different sub-versions or series of versions of individual packages, such as versions 4.1, 4.2, 4.3 as well as 5.1, 5.2, 5.3, and so forth. The most-current version ID 166 can be established and built, for instance, by different entities such as the one or more package servers 172, any one or more independent software vendors (ISVs) and/or other vendors or contributors, the package manager 110 of individual clients 102, and/or other entities, services, or logic.

Figure 3:
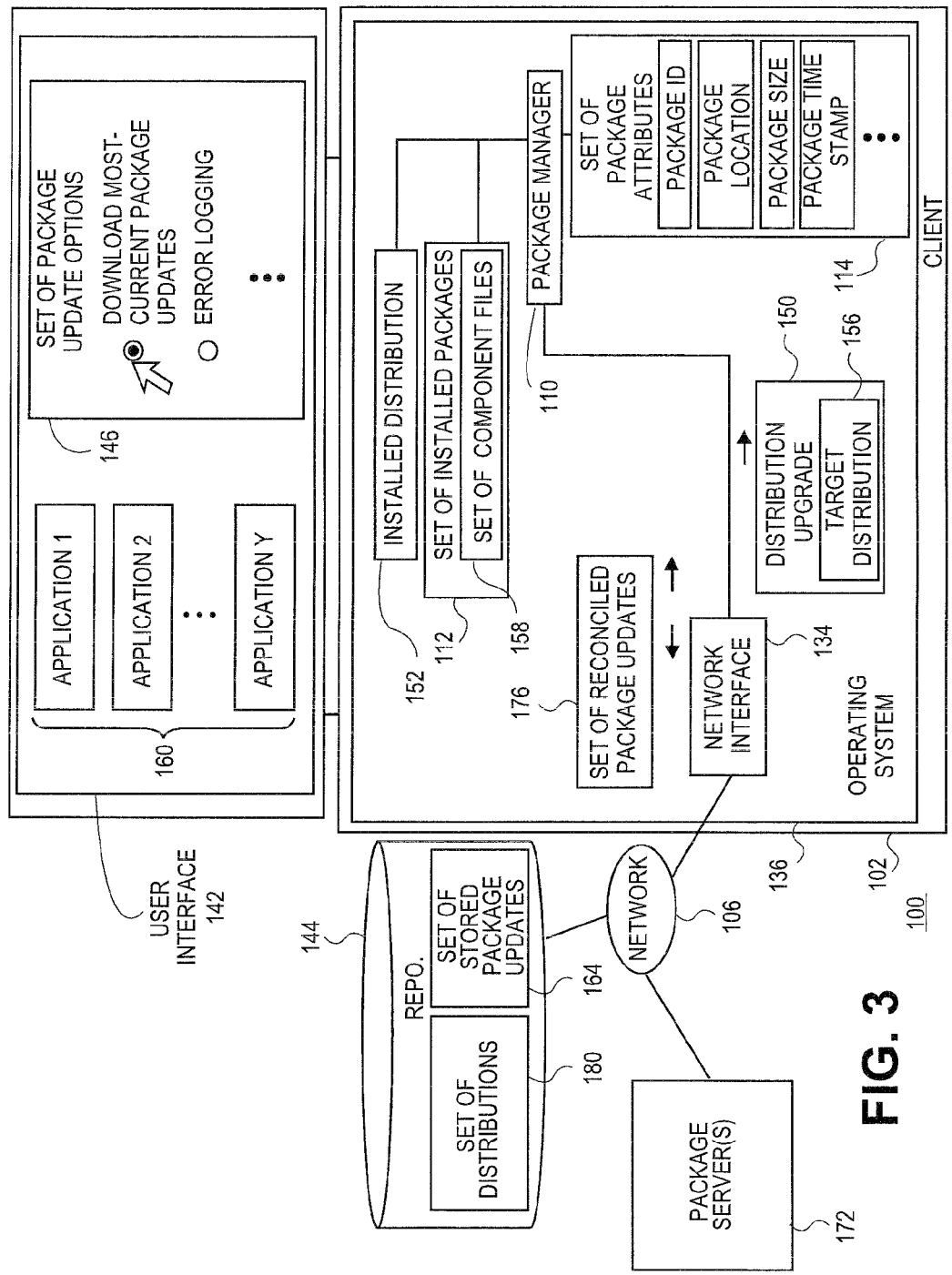
FIG. 3 illustrates an overall network in which for systems and methods for automatic upgrade and downgrade in package update operations can be implemented, according to various embodiments in further regards.

As illustrated for example more particularly in FIG. 3, package manager 110 can accordingly receive a request to initiate a distribution upgrade 150 from a installed distribution 152 to a target distribution 156, to begin distribution update processing. In embodiments, the request to initiate the distribution upgrade 150 can be received from a user of client 102 through a dialog and/or other user input, and/or can be initiated automatically such as via a software program or service. The request can specify the target distribution 156, and/or the target distribution 156 can be identified by the package manager 110 and/or other logic, such as by identifying the most-current or highest version of the subject software distribution, such as an operating system distribution. Once the installed distribution 152 and target distribution 156 are identified, the package manager 110 and/or other logic can initiate the processing of the set of target distribution packages 162 to determine the currency and/or version status of each package in the set of target distribution packages 162. In aspects, the package manager 110 and/or other logic can access the version reconciliation table 158 to access the most-current package version 166 for each package version ID 154 stored in the version reconciliation table 158 for the target distribution 156. For packages whose version contained in the target distribution 156 matches the most-current package version 166, upgrade operations can continue using the package contained in the target distribution 156. For packages whose version contained in the target distribution 156 does not match the most-current package version 166, upgrade operations can apply additional decision logic to determine which package version to install. If the most-current package version 166 points to a package which is available in the set of package servers 172 and/or one or more software repositories 144, the package manager 110 and/or other logic can retrieve that package or packages from those remote resources instead, and/or in replacement of, the package in the target distribution 156 and/or already installed on client 102. In aspects, the most-current package version 166 can identify a package by package version ID 154 whose formal file name, version, and/or other identifying attribute may or may not be the highest-valued identifier, but whose actual currency status is the most-current, highest, or most-recent version available to update the corresponding package in the installed distribution 152, and/or otherwise forms or constitutes a match as an upgrade to the subject package version ID 154. In aspects, the most-current package version 166 can be identified by a release date, rather than file or version identifier, and/or by other attributes. In aspects, the most-current package version 166 can be identified by verification of the software vendor which supplies the subject package, and/or by the user or other sources. Each package whose most-current version is located and/or identified or verified as an upgrade match can be upgraded to that version. In embodiments, the set of packages updated to most-current version status from the target distribution 156 can be recorded to a set of reconciled package updates 176. In aspects, the package manager 110 and/or other logic can store the set of reconciled package updates 176, for instance to the one or more package servers 172, one or more repositories 144, local store 178, and/or other databases or data stores. In embodiments, when a further request to perform a distribution upgrade from installed distribution 152 to target distribution 156 has been received, the requesting client or other entity can access the set of reconciled package updates 176 to immediately identify the proper packages to be installed to achieve current or up-to-date status for an upgrade between those two distribution versions. In aspects, the set of reconciled package updates 176 can be made available or applied within a specified or predetermined window, such as 1 day, 7 days, or other periods of time, since the individual packages in the most-current package version 166 and/or target distribution 156 can be updated at any time by vendors or other contributors, and the set of reconciled package updates 176 will not represent the most-current complement of package versions indefinitely. The set of reconciled package updates 176 can also, in embodiments, store a record of substitutions made to achieve most-current status for any one or more packages in the most-current package version 166 and/or target distribution 156, so that a user may revert to prior or less than most-current versions, if desired.

Figure 4:
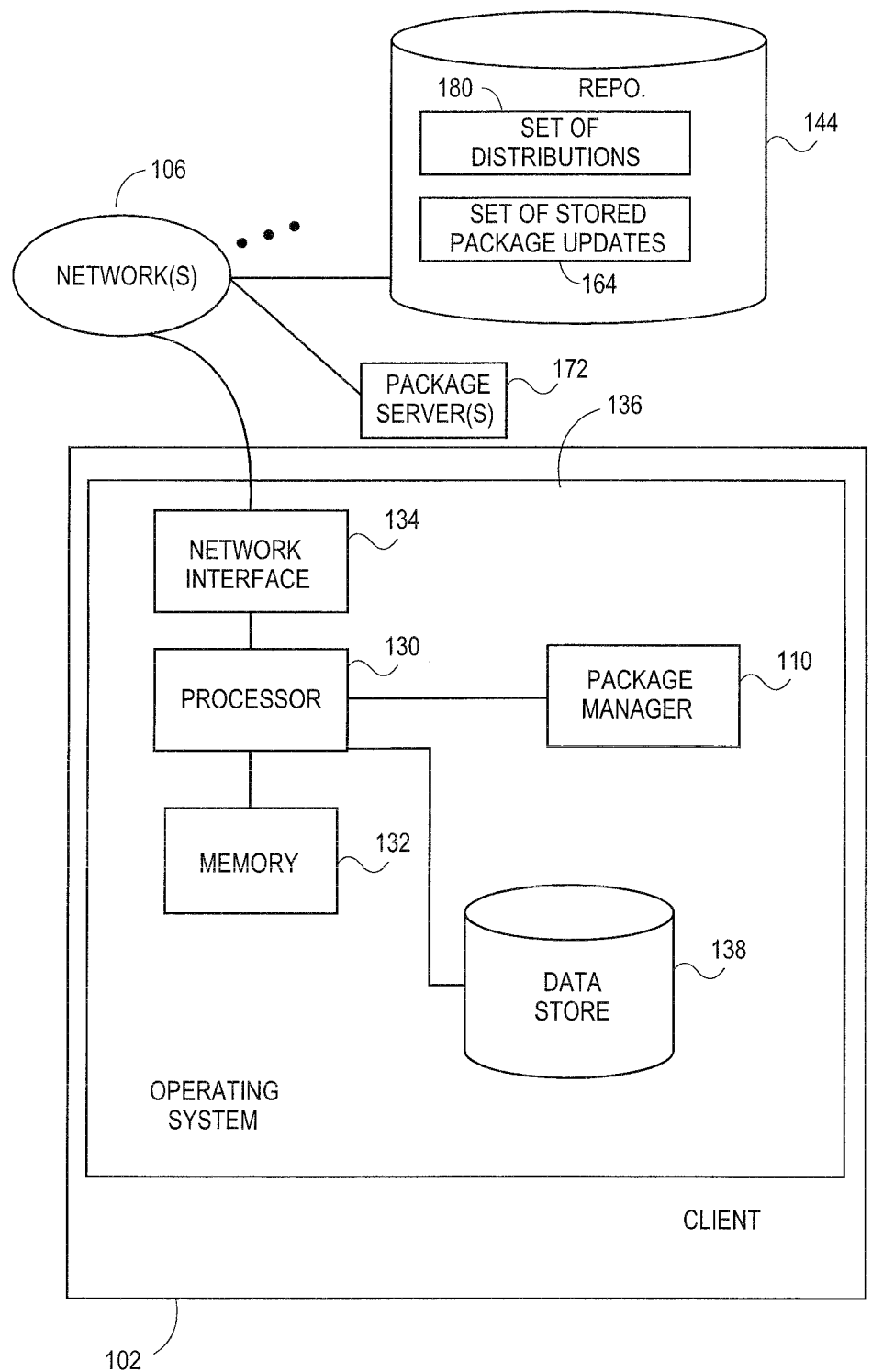
FIG. 4 illustrates a diagram of exemplary hardware and other resources that can be used in the implementation of systems and methods for automatic upgrade and downgrade in package update operations, according to various embodiments.

FIG. 4 illustrates an exemplary diagram of hardware and other resources that can be incorporated in the client 102 configured to initiate, install, host, manage, and analyze a distribution upgrade 150 and/or other package-related operations. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 can thereby communicate with the one or more package servers 172, the one or more repositories 144, and/or other resources via the one or more networks 106. Processor 130 also communicates with package manager 110, and/or other resources to execute control logic and control the inventorying, subset selection, updating, installation, analysis and management of software distributions, software packages, and their associated files and/or processes. Other configurations of client 102, including processor and memory resources, associated network connections, and other hardware and software resources are possible. It may be noted that in embodiments, the one or more package servers 172 and/or other machines or platforms in a network communicating with the client 102 can comprise or contain similar hardware, software, and other resources as the illustrated platform of the client 102, or can host or comprise different hardware and software configurations.

Figure 5:
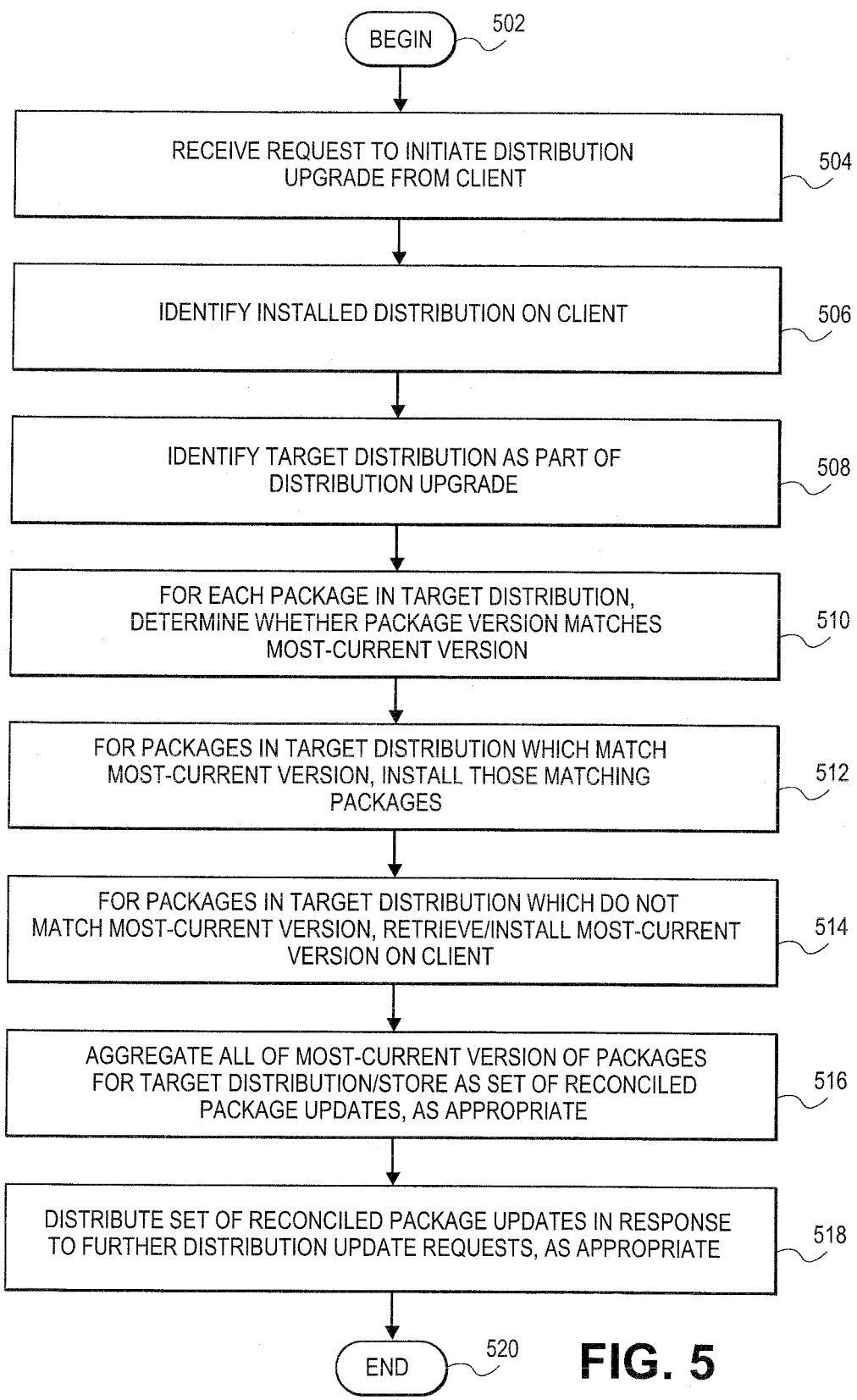
FIG. 5 illustrates a flowchart of overall distribution and package upgrade processing that can be used in systems and methods for automatic upgrade and downgrade in package update operations, according to various embodiments.

FIG. 5 illustrates overall processing to receive distribution and software package information and update requests from machines, and to analyze packages in the target distribution 156 to ensure that the most-current package versions are installed, according to various embodiments. In 502, processing can begin. In 504, the package manager 110 and/or other logic can receive a request to initiate a software distribution 150 from a user, application, service, and/or other source. In 506, the package manager 110 and/or other logic can identify the installed distribution 152 that is already installed and hosted on the client 102, and from which an upgrade is requested.

In 508, the package manager 110 and/or other logic can identify the target distribution 156 as part of the distribution upgrade 150 to be performed on the client 102. In 510, for each package in the target distribution 156, the package manager 110 and/or other logic can determine whether the package version as identified in the package version ID 154 matches the most-current version 166 as identified in the version reconciliation table 158 and/or other data or reference. In 512, for all packages in the target distribution 156 whose version matches the most-current version 166, the package manager 110 and/or other logic can install those packages to client 102. In 514, for all packages in the target distribution 156 whose version does not match the most-current version 166, the package manager 110 and/or other logic can identify, retrieve, and install most-current version 166 on the client 102. In aspects, for packages requiring substitution with the target distribution 156, the package manager 110 and/or other logic can locate and retrieve those packages from a local or remote data source, such as the one or more package servers 172 and/or associated one or more software repositories 144, and/or other sources.

In 516, the package manager 110 and/or other logic can aggregate all of the most-current version 166 packages for the target distribution 156, and can store those packages and/or their identifiers in the set of reconciled package updates 176, along with other packages in the target distribution 156 which have been determined to already represent the most-current version 166. In aspects, the set of reconciled package updates 176 can for instance be stored to the one or more package servers 172, the one or more repositories 144, and/or other local or remote storage or platforms. In 518, the set of reconciled package updates 176 can be distributed by the one or more package servers 172, the one or more repositories 144, and/or other entities or logic in response to further distribution upgrade or update requests, for instance by other clients or targets which request the pairwise upgrade from the same installed distribution 152 and target distribution 156. It may be noted that in embodiments, the later distribution of the set of reconciled package updates 176 can be limited in time, for instance to within a predetermined period of time, due to the fact that the constituent packages in the most-current package version 166 and/or target distribution 156 can be continuously updated by vendors or other software contributors. In 520, processing can return to a prior processing point, jump to a further processing point, or end.

The foregoing description is illustrative, and variations in configuration and implementation may occur to persons skilled in the art. For example, while embodiments have been described in which a unitary package manager 110 operating on client 102 is configured to control package management and client identification activity, in embodiments, multiple local and/or remote applications or software can interact to control the downloading, installation, testing, and other management of distribution updates and software packages.

For further example, while embodiments have been described in which the analysis and management of the distribution upgrade 150 is conducted by the local package manager 110 on the client 102, in embodiments, the distribution upgrade 150 can be managed by additional and/or other logic. For instance, other applications or services can host part or all of the logic used to check the target distribution 156 against the version reconciliation table 158 and/or other references or data. Similarly, while the logic which controls the distribution upgrade 150 has been described as residing in the package manager 110 on the client 102, in embodiments, the same or similar logic can be partly or entirely hosted in remote resources, such as services and/or remote platforms, such as the one or more package servers 172 and/or the associated one or more repositories 144. For further example, while embodiments have been described in which the target distribution 156 and other data can be stored or accessed from a group of one or more package servers 172 and/or associated one or more repositories 144 and other records, in embodiments, multiple groups or sets of package servers and/or repositories can perform distribution storage and management, package search, and other activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:

receiving a request to perform a distribution upgrade from an installed distribution comprising a first set of software packages installed on a client machine to a target distribution comprising a second set of software packages;
retrieving a version reconciliation data having stored thereon a most-current version of each software package in the second set of software packages;
determining a version of each package in the second set of software packages;
determining a most-current version for each package in the second set of software packages in view of the retrieved version reconciliation data;
determining whether the most-current version of each package in the second set of software packages is a match for an upgrade for the version in the second set of packages;
for each package that matches the most-current version, upgrading, by a processor executing a package manager, the matched package in the first set of packages to the version of the corresponding package in the second set of packages; and
for each package that does not match the most-current version,
retrieving the most-current version of the unmatched package from a package server; and
upgrading, by the processor executing the package manager, unmatched package in the first set of packages to the retrieved most-current version.

2. The method of claim 1, wherein the installed distribution and the target distribution comprise a pair of distributions comprising a closest-available version rating.

3. The method of claim 1, wherein the installed distribution and the target distribution comprise a pair of distributions comprising a version rating that differs by more than a closest-available degree.

4. The method of claim 1, wherein the determining a most-current version for each package in the second set of software packages comprises accessing the version reconciliation data recording the most-recent version for packages in the second set of software packages, and wherein the version reconciliation data is stored in a version reconciliation table.

5. The method of claim 1, wherein at least one of the installed distribution or the target distribution is accessed via a software repository.

6. The method of claim 1, wherein at least one of the determining a version of each package in the second set of software packages, the determining a most-current version for each package in the second set of software packages, or the determining whether the most-current version of each package in the second set of software packages is a match for an upgrade of the version in the second set of packages is performed by the package manager hosted on the client.

7. The method of claim 1, wherein at least one of the determining a version of each package in the second set of software packages, the determining a most-current version for each package in the second set of software packages, or the determining whether the most-current version of each package in the second set of software packages is a match for an upgrade for the version in the second set of packages is performed by a package server remote to the client.

8. The method of claim 1, wherein at least two packages in the second set of packages are distributed by different vendors.

9. The method of claim 1, further comprising:
determining that at least one package in the first set of software packages has no corresponding package in the second set of software packages, and
downgrading the version of each package in the second set of packages to the most-current version when the at least one package in the first set of software package has no corresponding package in the second set of software packages.

10. The method of claim 9, further comprising generating a set of reconciled package updates from the installed distribution to the target distribution in view of the final set of upgraded and downgraded packages.

11. The method of claim 10, further comprising storing the set of reconciled package updates to a software repository.

12. A system, comprising:
an interface to a data store to store a set of software distributions; and
a processor to communicate with the data store via the interface, wherein the processor executes instructions to:
receive a request to perform a distribution upgrade from an installed distribution comprising a first set of software packages installed on the client machine to a target distribution comprising a second set of software packages stored in the data store,
retrieve a version reconciliation data having stored thereon a most-current version of each software package in the second set of software packages,
determine a version of each package in the second set of software packages,
determine a most-current version for each package in the second set of software packages in view of the retrieved version reconciliation data,
determine whether the most-current version of each package in the second set of software packages is a match for an upgrade for the version in the second set of packages,
for each package that matches the most-current version, upgrade the matched package in the first set of packages to the version of the corresponding package in the second set of packages, and
for each package that does not match the most-current version,
retrieve the most-current version of the unmatched package from a package server; and
upgrade unmatched package in the first set of packages to the retrieved most-current version.

13. The system of claim 12, wherein the installed distribution and the target distribution comprise a pair of distributions comprising a closest-available version rating.

14. The system of claim 12, wherein the installed distribution and the target distribution comprise a pair of distributions comprising a version rating that differs by more than a closest-available degree.

15. The system of claim 12, wherein the determining a most-current version for each package in the second set of software packages comprises accessing version reconciliation data recording the most-recent version for packages in the second set of software packages, and wherein the version reconciliation data is stored in a version reconciliation table.

16. The system of claim 12, wherein the data store comprises a software repository, and the at least one of the installed distribution or the target distribution is accessed via the software repository.

17. The system of claim 12, wherein the updates are performed on a client machine, and wherein at least one of the determining a version of each package in the second set of software packages, the determining a most-current version for each package in the second set of software packages, or the determining whether the most-current version of each package in the second set of software packages is a match for an upgrade of the version in the second set of packages is performed by a package manager hosted on the client.

18. The system of claim 12, wherein at least one of the determining a version of each package in the second set of software packages, the determining a most-current version for each package in the second set of software packages, or the determining whether the most-current version of each package in the second set of software packages is a match for an upgrade of the version in the second set of packages is performed by a package server remote to the client.

19. The system of claim 12, wherein at least two packages in the second set of packages are distributed by different vendors.

20. The system of claim 12, the processor further:
   determine that at least one package in the first set of software packages has no corresponding package in the second set of software packages, and
   downgrade the version of each package in the second set of packages to the most-current version when the at least one package in the first set of software package has no corresponding package in the second set of software packages.

* * * * *